Aug. 25, 1931.                R. LEEDS                1,820,233
                            KITCHEN UTENSIL
                          Filed April 8, 1929
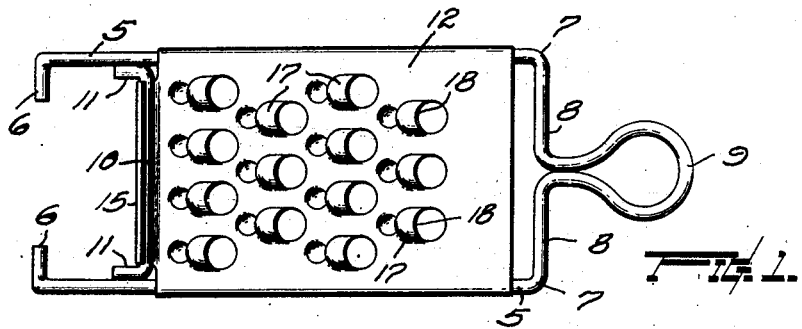
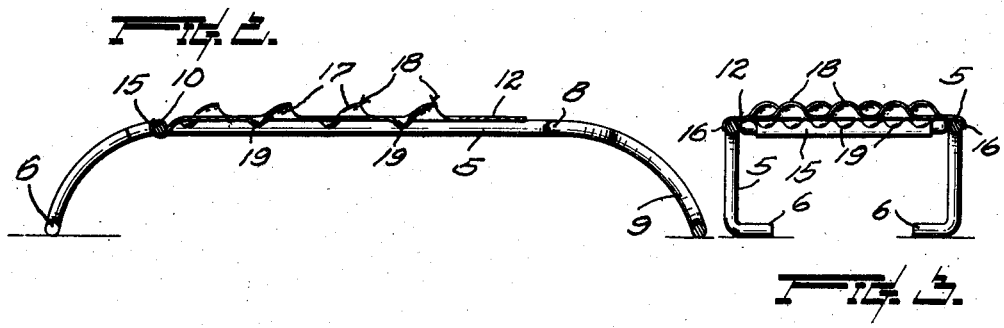
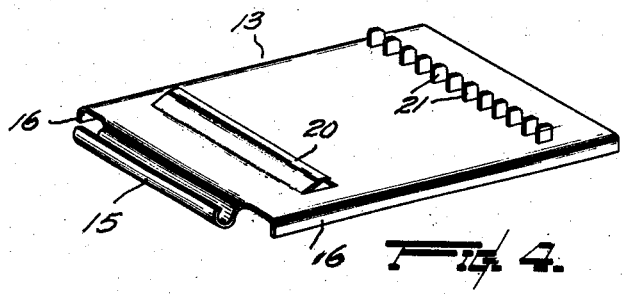
INVENTOR
Ruby Leeds
BY
ATTORNEY Patented Aug. 25, 1931

1,820,233

UNITED STATES PATENT OFFICE

RUBY LEEDS, OF SEATTLE, WASHINGTON

KITCHEN UTENSIL

Application filed April 8, 1929. Serial No. 353,527.

This invention relates to that class of kitchen utensils used for cutting and slicing fruits, vegetables, etc.

The object of the invention, generally stated, is the improvement in devices of this character to render the same more efficient in operation, more convenient to use, and which may readily be kept in a clean and sanitary condition.

Another object is to provide a cutting and slicing utensil having a novel form of frame which is adapted to support, interchangeably, cutters adapted to produce different kinds of work.

Another object is to provide a stand or frame which will be of simple, inexpensive, strong and durable construction.

With these and other ends in view, the invention consists in the novel construction, adaptation and combination of parts hereinafter described and claimed.

In the accompanying drawings,—

Figure 1 is a plan view of a vegetable or fruit cutting device embodying one form of cutter; Figs. 2 and 3 are vertical longitudinal and transverse sections, respectively, of Fig. 1; and Fig. 4 is a perspective view showing another form of cutter member.

As shown, I provide a frame constructed, preferably, of strong, stiff wire composed of side rail elements 5 extending parallel in vertical planes from inturned feet 6 to right angular bends 7 and thence inwardly as at 8 to a loop 9. The loop 9 is turned downwardly as shown in Fig. 2 to provide a third foot centrally of the width of the frame and at the opposite end thereof from the transversely spaced feet 6.

Said frame includes a bar element 10 disposed transversely of the frame and which may be provided by a piece of wire having extremities 11 welded or otherwise rigidly secured to the side elements 5.

The portion of the frame from the bends 7 to the bar 10 is disposed to be substantially horizontal when the frame is supported in the upright position in which it is shown in Figs. 2 and 3.

Adapted to seat upon and detachably engage said frame is a cutter plate, as 12 or 13 for example, of a suitable shape or configuration to perform a desired operation.

A cutter plate is formed with a top substantially rectangular in plan, with a hook shaped element 15 at one end and with the concavity thereof above so as to be engageable with the bar element 10 of the frame from below, and having along each side a downwardly directed flange 16 adapted to resiliently engage both of the parallel side portions of the frame rail elements to secure the plate with said frame.

To couple a cutter plate with the supporting frame therefor the hook element 15 is engaged with the frame bar 10 while the plate is in an inclined position and then turning the plate downwardly to engage the plate throughout its length to the frame.

A cutter plate is stamped or otherwise formed to a configuration suitable for producing a certain kind of work; the plate 12, for example, is provided with transverse rows or longitudinally sloping scoop like cutting elements 17 extending upwardly from the plane of the plate to cutting edges 18.

The plate 12, moreover, is formed to provide protuberances 19 extending downwardly from the rear of the respective cutting elements. Said protuberances function as abutments about or against which engage ribbons of the material being prepared.

The plate 13 shown in Fig. 4, illustrates a construction designed to provide near one end thereof with a slicing bit 20 and near its other end a series of knife elements 21 which serve to divide the material into strips by pushing the same endwise of the frame. The slicing and cutting an article into strips may be accomplished selectively or both may be accomplished successively in a single operation according to which part of the plate 13 is utilized.

The invention and the manner of using the same will be understood from the foregoing description.

What I claim,—

1. In a kitchen utensil of the character described, the combination of a wire frame having a plurality of supporting leg elements, and a rectangular cutter plate detachably mounted upon said frame, said cutter plate being adapted to be connected at one end thereof with the underside of the frame and at opposite sides of the frame by means of downwardly extending flanges.

2. In a kitchen utensil of the character described, in combination, a supporting frame having side rail elements and a transversely arranged bar element extending between said rail elements, and a cutter plate provided with a hook at one end thereof engageable with said bar element and side flanges adapted for engagement with the side rails of the frame and coacting with said hook for separably connecting the frame and plate together.

3. In a kitchen utensil of the character described, the combination of a cutter plate and a supporting frame therefor, said plate comprising transversely and longitudinally spaced cutter elements extending angularly upwardly from the plane of the plate and projecting forwardly from said angular portion to a substantial horizontally disposed cutting edge, and protuberances extending downwardly below the plane of said plate as a continuation of the angular contour of said cutting elements.

4. In a kitchen utensil of the character described, the combination with a frame providing spaced-apart side rails of a circular configuration, said frame having a plurality of supporting leg members, of a rectangular cutter plate detachably engageable to said frame, said cutter plate providing lateral downturned flanges having an arcuate configuration relatively in excess of a 90° arc and conformed of spring metal in affording a clipping of the terminal points about said side rails.

Signed at Portland, Oregon, this 1st day of April, 1929.

RUBY LEEDS.